United States Patent
He et al.

(10) Patent No.: US 11,694,011 B2
(45) Date of Patent: Jul. 4, 2023

(54) CIRCUIT HEALTH STATE PREDICTION METHOD AND SYSTEM BASED ON INTEGRATED DEEP NEURAL NETWORK

(71) Applicant: WUHAN UNIVERSITY, Hubei (CN)

(72) Inventors: Yigang He, Hubei (CN); Ming Xiang, Hubei (CN); Hui Zhang, Hubei (CN); Bolun Du, Hubei (CN); Liulu He, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 331 days.

(21) Appl. No.: 17/178,254

(22) Filed: Feb. 18, 2021

(65) Prior Publication Data
US 2022/0043955 A1    Feb. 10, 2022

(30) Foreign Application Priority Data
Aug. 10, 2020  (CN) .......................... 202010796013.X (51) Int. Cl.
*G06F 30/367* (2020.01)
*G06F 30/373* (2020.01)
*G06N 3/04* (2023.01)

(52) U.S. Cl.
CPC .......... *G06F 30/367* (2020.01); *G06F 30/373* (2020.01); *G06N 3/04* (2013.01)

(58) Field of Classification Search
CPC ......... G06F 30/367; G06F 30/27; G06N 3/04; G06N 3/08
See application file for complete search history.

(56) References Cited

U.S. PATENT DOCUMENTS

2022/0355839 A1* 11/2022 Boucher ................ G06Q 50/30

FOREIGN PATENT DOCUMENTS

CN      109726524 A    *    5/2019

OTHER PUBLICATIONS

Ren et al. A Data-Driven Auto-CNN-LSTM Prediction Model for Lithium-Ion Battery Remaining Useful Life IEEE Transactions on Industrial Informatics, vol. 17, No. 5, May 2021 (Year: 2021).*
Duan et al. Intelligent Localization of Transformer Internal Degradations Combining Deep Convolutional Neural Networks and Image Segmentation IEEE Access, May 2019 (Year: 2019).*
CN-109726524B (Year: 2019).*

* cited by examiner

*Primary Examiner* — Rehana Perveen
*Assistant Examiner* — Cuong V Luu
(74) *Attorney, Agent, or Firm* — JCIPRNET (57) ABSTRACT

A circuit health state prediction method and system based on an integrated deep neural network are provided and relates to a technique for predicting a power electronic circuit failure. The invention serves to identify and diagnose a health state of a simulation circuit based on historical data by using an integrated deep neural network, and the method includes: carrying out parameter aging simulation experiments for different devices; extracting a series of time domain features of output signals through a temporal transformation method, and establishing health indices of the devices based on an improved angular similarity; predicting a health state of the simulation circuit in degeneration by using CAE and LSTM-RNN; and predicting validity of the circuit health state prediction method by referring to relevant evaluation indices. The invention is capable of effectively predicting the health state of the simulation circuit and is highly accurate and easy to implement.

9 Claims, 8 Drawing Sheets

CIRCUIT HEALTH STATE PREDICTION METHOD AND SYSTEM BASED ON INTEGRATED DEEP NEURAL NETWORK

CROSS-REFERENCE TO RELATED APPLICATION

This application claims the priority benefit of China application no. 202010796013.X, filed on Aug. 10, 2020. The entirety of the above-mentioned patent application is hereby incorporated by reference herein and made a part of this specification.

BACKGROUND OF THE INVENTION

Field of the Invention

The invention relates to a technique for predicting a power electronic circuit failure, and more specifically relates to a circuit health state prediction method and system based on an integrated deep neural network.

Description of Related Art

In the current era of information, the informatization in the manufacture sector, vehicles, power grids, etc., has become unprecedentedly complicated through the development of integrated circuits. The coupling of electronic components and devices within a system certainly has facilitated the informatization, but nevertheless pose challenges to the reliability and the operational efficiency of equipment. Meanwhile, the aging and degeneration of a device in an electronic circuit may have significant impacts and therefore require attention.

In a simulation circuit, the respective devices, i.e., a capacitor, a resistor, an inductor, a power switch, etc., may all age and exhibit degenerated performance. Various degeneration modes have various impacts on the operation performance of circuits. Nowadays, electronic devices are highly integrated. Therefore, if the impact of a system failure on the external characteristics of the overall operating circuit cannot be timely and accurately predicted, the factory may not be able to make a reasonable arrangement to the subsequent production plan, and the failure may become worsened and affect other components, leading to partial or complete malfunctioning and affecting the operation of the system.

A system health state prediction method is generally classified into three types, i.e., model-based methods, data-based methods, and mixed prediction methods. A model-based method builds a physical model of the original system at the ratio of 1:1 in hope to fully reconstruct the internal operational mechanism of the system. However, such method requires a very high accuracy in the measurements of system parameters. Meanwhile, in order to accurately predict the output state when the system is operating, a model needs to be built and management needs to be implemented for the operating environment. Therefore, the model-building cost and the computational complexity of such a method are high. Besides, this type of method is parameter-sensitive. That is, if some parameters, such as system internal time-variable parameters, ambient temperature, and load condition, change, such change may lead to a significant impact on the accuracy of the prediction. A data-based prediction method assumes the system to be a black box. By analyzing the internal relatedness between input data and output data by using relevant methods, data in the future may be determined quickly and accurately. While a mixed prediction method integrates the advantages of the two types of methods described above, it is still significantly influenced by the model-based method. For example, the computational complexity remains high, and the method remains parameter-sensitive and has difficulties in building a model.

SUMMARY OF THE INVENTION

In view of the above, the embodiments of the invention provide a circuit health state prediction method and system based on an integrated deep neural network. The method and the system are provided for predicting a failure when the parameters of a simulation circuit degenerate, and are capable of accurately and efficiently making a prediction and easy to implement.

An aspect of the invention provides a circuit health state prediction system based on an integrated deep neural network. The circuit health state prediction method includes: (1) establishing a regeneration simulation model of a circuit to be predicted, carrying out parameter aging simulation experiments for different devices, and collecting output signals of the respective devices; (2) extracting time domain features of the output signals of the respective devices through a temporal transformation method, and establishing a health index of each of the devices based on each of the time domain features; and (3) predicting a health state of the circuit to be predicted which is in degeneration by using a convolutional autoencoder (CAE) and a long short term memory-recurrent neural network (LSTM-RNN) together based on the health index of each of the devices.

According to an embodiment of the invention, the health index of each of the devices is established through $$dis(x_1, x_2) = 1 - \frac{1}{\pi} \cdot \arccos \frac{x_1 \cdot x_2}{\sqrt{\sum_{k=1}^{n} [x_1^{(k)}]^2 \times \sum_{k=1}^{n} [x_2^{(k)}]^2}}.$$

$x_1=(x_1^{(1)}, x_1^{(2)}, \ldots, x_1^{(n)})$ represents a time domain feature of the output signal of the device under a healthy state, $x_2=(x_2^{(1)}, x_2^{(2)}, \ldots, x_2^{(n)})$ represents a time domain feature of the output signal of the device during an aging process, and n represents a time domain feature vector length.

According to an embodiment of the invention, In (2), 10 time domain feature indices that are extracted include:

$$tf_1 = \max(s_t), tf_2 = \frac{1}{N}\sum_{t=1}^{N} s_t, tf_3 = \frac{1}{N}\sum_{t=1}^{N} s_t^2,$$

$$tf_4 = \sqrt{\frac{1}{N}\sum_{t=1}^{N}(s_t - \bar{s})^2}, tf_5 = \sqrt{\frac{1}{N}\sum_{t=1}^{N}(s_t - \bar{s})^3}, tf_6 = \frac{tf_5^2}{tf_4^3},$$

$$tf_7 = \frac{tf_1}{|\bar{s}|}, tf_8 = \frac{tf_1}{tf_3}, tf_9 = \frac{tf_1}{tf_2}, \text{ and } tf_{10} = \frac{\frac{1}{N}\sum_{t=1}^{N}(s_t - \bar{s})^4}{tf_4^4}.$$

$s_t$ represents an output signal value at a point t in a degeneration process at a current time, N represents a total number of output signal points of a degeneration sample at the time, and the output signals are divided into two groups. $tf_1$ to $tf_3$ describe original output signals according to an influence of energy accumulation of the output signals, $tf_4$ to $tf_{10}$ describe the original output signals from a perspective of statistic distribution, and $\bar{s}$ represents an arithmetic mean of the output signals of the degeneration sample at the time.

According to an embodiment of the invention, the CAE includes three types of hidden layers, which are a convolutional layer, a pooling layer, and a deconvolutional layer, represented as $$\begin{cases} l = P(AF(\text{conv}(X) + b_1)) \\ \hat{X} = AG(\text{de\_conv}(l) + b_2) \\ \min L = D(X, \hat{X}) + \Omega \end{cases}$$

$P(\bullet)$, $\text{conv}(\bullet)$, and $\text{de\_conv}(\bullet)$ are respectively symbols representing pooling, convolutional and deconvolutional operations. $AF(\bullet)$ and $AG(\bullet)$ represent activation functions corresponding to different hidden layers. $b_1$ and $b_2$ represent bias terms corresponding to different hidden layers. $X$ and $\hat{X}$ respectively represent original input data and autoencoder predicted data. $D(\bullet)$ computes and reflects a difference between $X$ and $\hat{X}$, $\Omega$ represents a regularization term serving to prevent a prediction from overfitting. In addition, L represents a cost function.

According to an embodiment of the invention, (3) includes: processing the health index of each of the devices by using the CAE, extracting and transmitting feature information of the hidden layers in the CAE to the LSTM-RNN to carry out a regression computational operation, and updating a network parameter by using an Adam algorithm.

According to an embodiment of the invention, the circuit health state prediction method further includes: evaluating a prediction performance by adopting relevant evaluation criteria, wherein the evaluation criteria comprise a score function and a root-mean-square error.

Another aspect of the invention provides a circuit health state prediction system based on an integrated deep neural network. The circuit health state prediction method includes: a data collection module, configured to establish a regeneration simulation model of a circuit to be predicted, carry out parameter aging simulation experiments for different devices, and collect output signals of the respective devices; a data processing module, configured to extract time domain features of the output signals of the respective devices through a temporal transformation method, and establish a health index of each of the devices based on each of the time domain features; and a prediction module, configured to predict a health state of the circuit to be predicted which is in degeneration by using a convolutional autoencoder (CAE) and a long short term memory-recurrent neural network (LSTM-RNN) together based on the health index of each of the devices.

According to an embodiment of the invention, the circuit health state prediction system further includes: an evaluation module, configured to evaluate a prediction performance by adopting relevant evaluation criteria, wherein the evaluation criteria comprise a score function and a root-mean-square error.

Yet another aspect of the invention provides a non-transitory computer-readable storage medium, storing a computer program. The computer program realizes the failure diagnosis method when being executed by a processor.

Based on the above, the technical solutions according to the embodiments of the invention exhibit the following over the conventional techniques. In the embodiments of the invention, the regeneration simulation model of a circuit to be predicted is established, the parameter aging simulation experiments for different devices are carried out, and the output signals of the respective devices are collected. The time domain feature vectors of the output signals of the respective devices are extracted through the temporal transformation method, and the health index of each of the devices is established based on each of the time domain feature vectors. The health state of the circuit to be predicted which is in degeneration is predicted by using the CAE and LSTM-RNN together based on the health index of each of the devices. Accordingly, the health state of the simulation circuit can be effectively predicted, the accuracy is high, and the implementation is easy.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

To more clearly and comprehensively describe the objectives, technical solutions, and advantages of the invention, the invention will be described in detail in the following with reference to the accompanying drawings and embodiments. It should be understood that the embodiments specifically described herein merely serve to describe the invention and shall not be construed as limitations on the invention. In addition, the technical features involved in the respective embodiments of the invention may be combined with one another as long as such technical features do not conflict each other.

Figure 1:
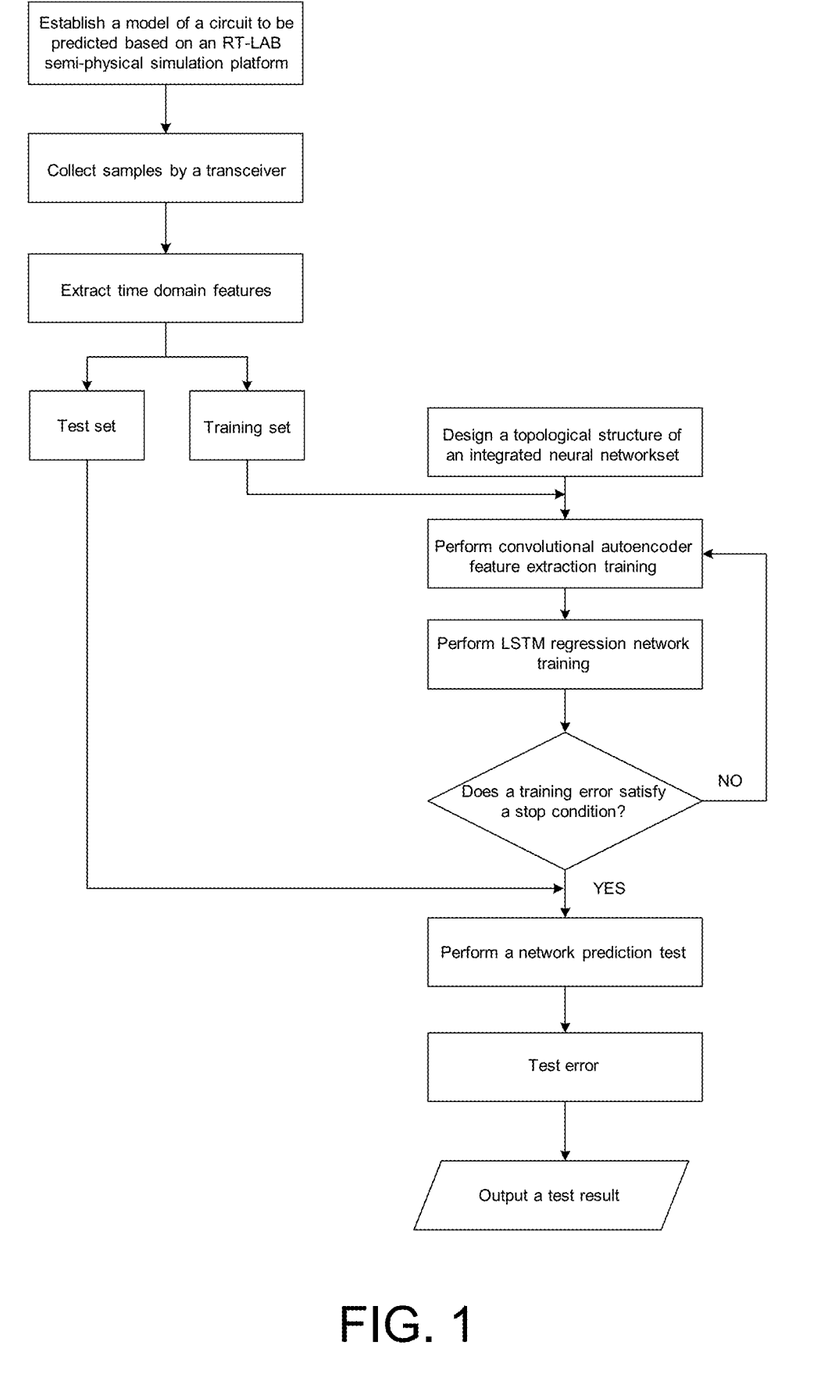
FIG. 1 is a schematic flowchart illustrating a circuit health state prediction method according to an embodiment of the invention.

As shown in FIG. 1, a circuit health state prediction method based on an integrated deep neural network according to an embodiment of the invention includes steps as described in the following.

(1) A regeneration simulation model of a circuit to be predicted is established, and parameter aging simulation experiments for different devices are carried out. In addition, currents or voltages of three branches are selected as observation and monitoring circuits, and output signals of the respective devices are collected.

In the embodiment of the invention, the parameter aging simulation experiments on different devices may be carried out based on a core energy assembly circuit of a large-scale ignition equipment of China Academy of Engineering Physics. The specific details are as follows.

Figure 2:
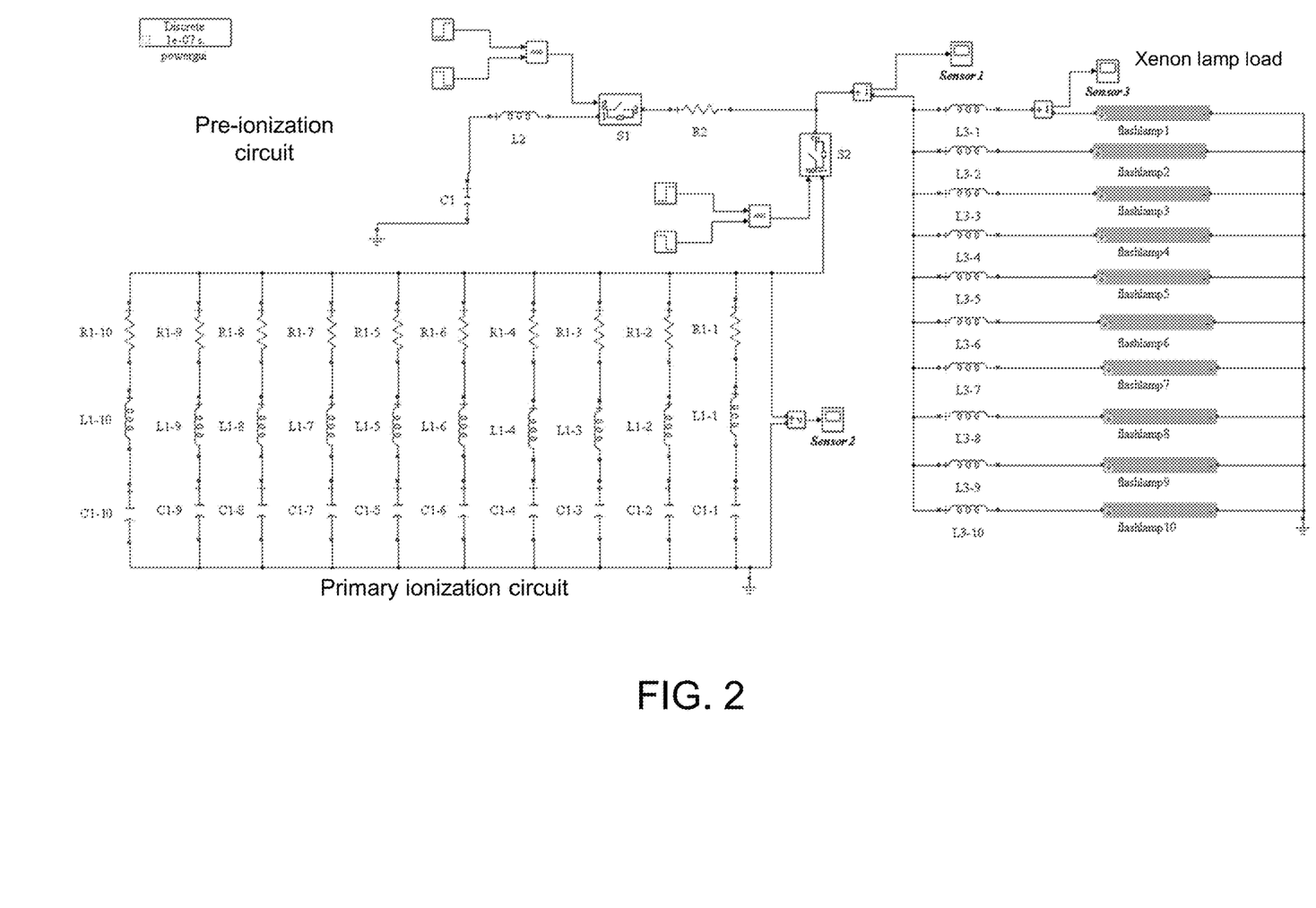
FIG. 2 is a simulated topological graph illustrating degeneration of a simulation circuit according to an embodiment of the invention.
Figure 3:
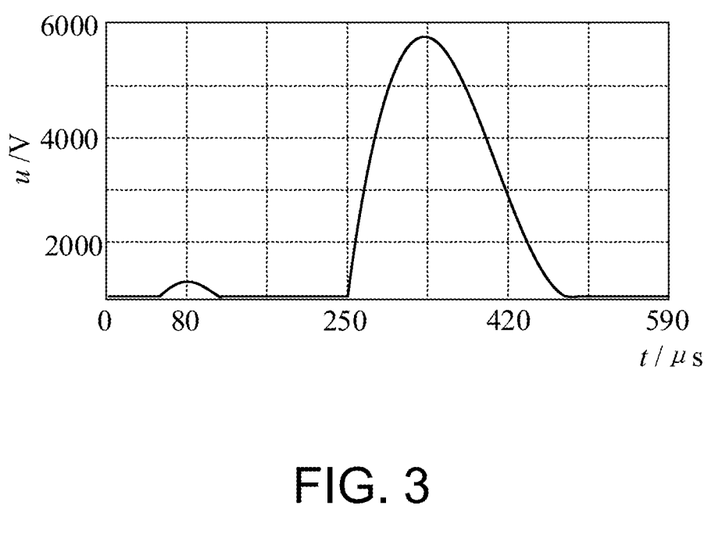
FIG. 3 is a discharge voltage waveform according to an embodiment of the invention.

The topology of the simulation circuit is the core part of the health state diagnosis and prediction. The simulation topological structure of Simulink is as shown in FIG. 2. The DC power source of the pre-ionization circuit is powered by a capacitor, and the voltage thereof is 12 kV. The voltage of the voltage supplying capacitor of the primary ionization circuit is 23 kV. First of all, the power supply capacitor of the circuit is charged to a predetermined voltage, and a switch S1 is turned off for 120 μs to complete a pre-ionization process. Then, after a waiting time of 130 μs, a switch S2 is turned off to complete a primary ionization process. Eventually, a xenon lamp on a terminal discharge circuit is turned on. An example of the discharge voltage waveform is shown in FIG. 3. As shown in FIG. 3, the pre-ionization process and the primary ionization process differ significantly in terms of times and energy amplitudes, so the two discharge processes should be analyzed independently.

RT-LAB is able to directly apply a mathematical model of a dynamic system established by MATLAB/Simulink to a real-time simulation, control, testing, and other relevant fields, and offers a full-fledged loop testing solution for rapid prototyping and hardware components. RT-LAB is capable of simplifying the process of designing an engineering system by establishing a dynamic model for engineering simulation or for a real-time system of a physical object in a loop within a short time. In order to more accurately simulate the degeneration process of the core energy assembly circuit, all the experimental processes in the embodiment of the invention are completed in such platform.

The embodiment of the invention mainly relates to the degeneration state analysis on energy storage devices, such as a capacitor, an inductor, and an energy device, such as a xenon lamp assembly in the circuit, and assumes that a device is failed completely when the rated device parameter deviation value is 60%. Based on the degeneration properties of these devices, the parameters thereof exhibit a continuous but slow change during the degeneration process. According to the embodiment of the invention, the number of degeneration cycles chosen in the simulation process is 100 to 200 and the step value is set at 4, so as to fully simulate the degeneration of the circuit in a real situation. The details of circuit parameters are as shown in Table 1.

Table 1 shows a table of the circuit degeneration parameters.

| Degeneration type | Device parameter | Degeneration cycle | Nominal value | Failure value | Parameter variation value |
|---|---|---|---|---|---|
| 1 | $K_{1-}\downarrow$ | 100 to 200 | 94.48 | 37.792 | 0.283 to 0.567 |
| 2 | $L_{1-k}\downarrow$ | 100 to 200 | 140 μH | 56 μH | 0.42 μH~0.82 μH |
| 3 | $L_{2-1}\downarrow$ | 100 to 200 | 100 μH | 40 μH | 0.3 μH~0.6 μH |
| 4 | $L_{3-k}\downarrow$ | 100 to 200 | 30 μH | 12 μF | 90 pH~180 pH |
| 5 | $C_{1-i}\downarrow$ | 100 to 200 | 87 μF | 34.8 μF | 261 pF~522 pF |
| 6 | $C_{2-1}\downarrow$ | 100 to 200 | 14 μF | 5.6 μF | 42 pF~84 pF |

Here, k=1, 2, 3, . . . , 10, and refers to a device serial number. In the embodiment of the invention, at the same moment, devices in parallel connection in the test circuit have the same parameter value. "↓" indicates that the parameter value is decreased with respect to the nominal value. There are a total of 156 degeneration data samples. The current and the voltage of the xenon lamp meet the equation as follows.

$$I = K\sqrt{U} \qquad (1)$$

Here, K represents a scale coefficient of the xenon lamp device, U represents voltages on two sides of the xenon lamp device, and I represents currents on two sides of the xenon lamp device.

(2) A series of time domain features of output signals are extracted through a temporal transformation method, and the health indices of the devices are established based on the improved angular similarity.

In the embodiment, the health index of each device may be established through $$dis(x_1, x_2) = 1 - \frac{1}{\pi} \cdot \arccos \frac{x_1 \cdot x_2}{\sqrt{\sum_{k=1}^{n} [x_1^{(k)}]^2 \times \sum_{k=1}^{n} [x_2^{(k)}]^2}}.$$

Here, $x_1=(x_1^{(1)}, x_1^{(2)}, \ldots, x_1^{(n)})$ represents the time domain feature of the output signal of the device under a healthy state, $x_2=(x_2^{(1)}, x_2^{(2)}, \ldots, x_2^{(n)})$ represents the time domain feature of the output signal of the device during the aging process, and n represents a time domain feature vector length.

More specifically, in Step (2), ten time domain feature indices that are extracted are:

| Serial no. | Feature |
|---|---|
| 1 | $tf_1 = \max(s_t)$ |
| 2 | $tf_2 = \frac{1}{N}\sum_{t=1}^{N} S_t$ |
| 3 | $tf_2 = \frac{1}{N}\sum_{t=1}^{N} S_t^2$ |
| 4 | $tf_4 = \sqrt{\frac{1}{N}\sum_{t=1}^{N}(S_t - \overline{S})^2}$ |
| 5 | $tf_5 = \sqrt{\frac{1}{N}\sum_{t=1}^{N}(S_t - \overline{S})^3}$ |
| 6 | $tf_6 = \frac{tf_5^2}{tf_4^3}$ |
| 7 | $tf_7 = \frac{tf_1}{|\overline{s}|}$ |
| 8 | $tf_8 = \frac{tf_1}{tf_3}$ |
| 9 | $tf_9 = \frac{tf_1}{tf_3}$ |
| 10 | $tf_{10} = \frac{\frac{1}{N}\sum_{t=1}^{N}(S_t - \overline{S})^4}{tf_4^4}$ |

Here, $s_t$ represents the output signal value at a point t (i.e., time t) in the degeneration process at the current time, N represents the total number of output signal points of the degeneration sample at the time. The output signals are divided into two groups. $tf_1$ to $tf_3$ describe the original output signals according to the influence of energy accumulation of the output signals, $tf_4$ to $t_{10}$ describe the original output signals from the perspective of statistic distribution, and $\overline{s}$ represents the arithmetic mean of the degeneration sample output signals at the time.

According to the analysis of Step (2), by analyzing the pre-ionization process and the primary ionization process independently, it is known that an individual sample vector exhibits a total of 60 time domain features. Since the amplitudes of the respective temporal components are different, in order to simplify the computation and effectively use the independent information each component contains, the sample vectors need to be normalized.

$$\overline{x}_i = 2\frac{x_i - \min x_i}{\max x_i - \min x_i} - 1 \quad (2)$$

Figure 4:
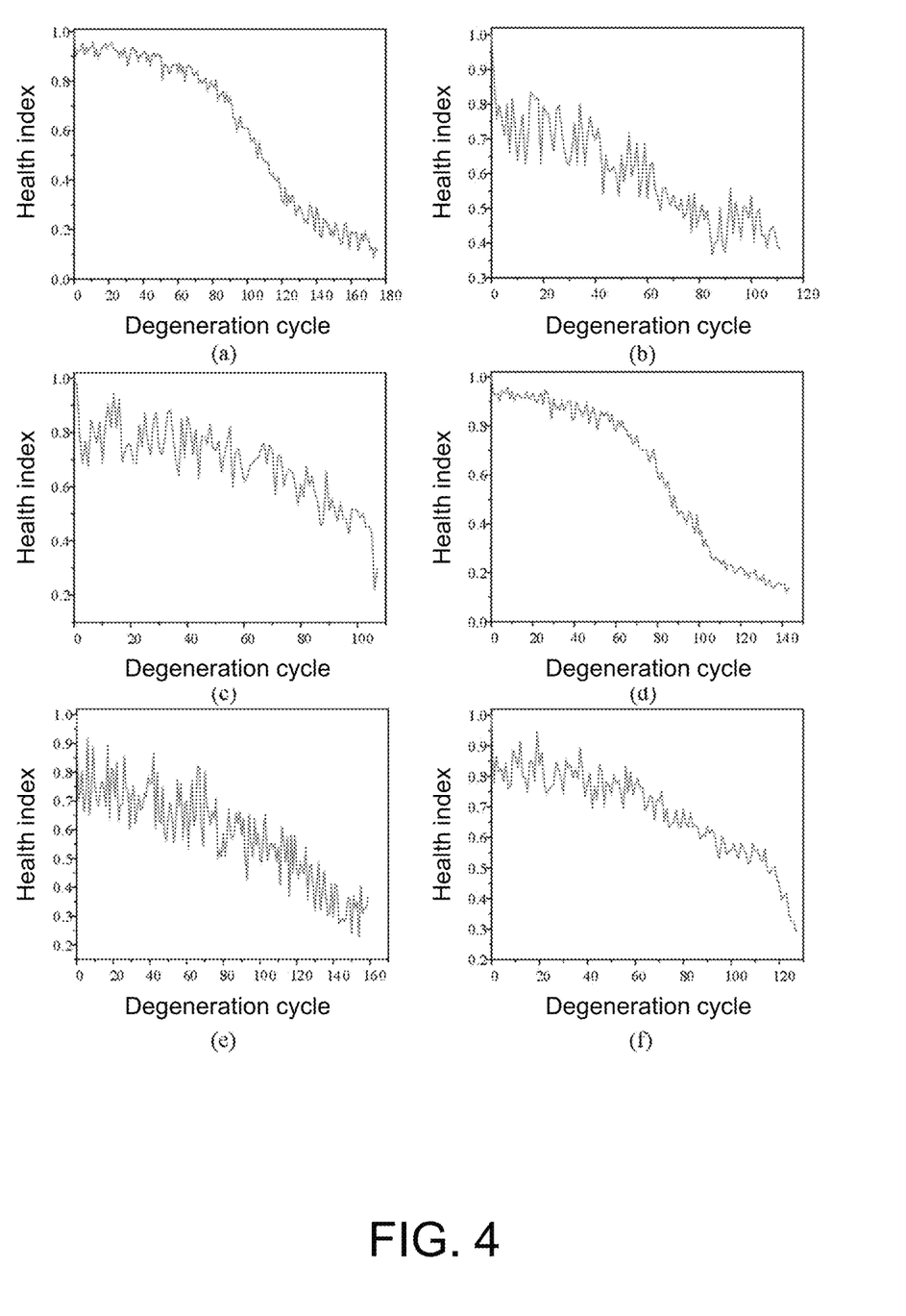
FIG. 4 is a schematic view illustrating health index curves according to an embodiment of the invention, wherein (a) represents an $L_{2-1}$ health index curve, (b) represents an $L_{1-1}$ health index curve, (c) represents a $C_{2-1}$ health index curve, (d) represents a $C_{1-1}$ health index curve, (e) represents an $L_{3-1}$ health index curve, and (f) represents a $K_{1-1}$ health index curve.

Here, $x_i$ represents the $i^{th}$ temporal feature sample, and $\overline{x}_i$ is the normalized temporal sample. It is known that the samples after normalization range within [−1, 1]. The similarity degree between the sample vector in the degeneration process and the sample vector without degeneration is computed by using the improved angular similarity algorithm, and such value is set as the health index. Examples of the health index curves are as shown in FIG. 4, wherein only one degeneration process is chosen for each device, (a) represents an $L_{2\text{-}1}$ health index curve, (b) represents an $L_{1\text{-}1}$ health index curve, (c) represents a $C_{2\text{-}1}$ health index curve, (d) represents a $C_{1\text{-}1}$ health index curve, (e) represents an $L_{3\text{-}1}$ health index curve, and (f) represents a $K_{1\text{-}1}$ health index curve. As shown in FIG. 4, the curves exhibit a gradual descending trend as the devices degenerate linearly, and such trend indicates that the curves can reasonably reflect the degeneration of the circuit.

(3) A convolutional autoencoder (CAE) and a long short term memory-recurrent neural network (LSTM-RNN) are used together to predict the health state of the simulation circuit in degeneration.

In the embodiment of the invention, the convolutional autoencoder CAE includes three types of hidden layers, i.e., a convolutional layer, a pooling layer, and an deconvolutional layer, and is represented as $$\begin{cases} l = P(AF(conv(X) + b_1)) \\ \hat{X} = AG(de\_conv(l) + b_2) \\ \min L = D(X, \hat{X}) + \Omega \end{cases}$$

wherein P(•), conv(•), and de_conv(•) are respectively symbols representing pooling, convolutional and deconvolutional operations, AF(•) and AG(•) represent activation functions corresponding to different hidden layers, $b_1$ and $b_2$ represent bias terms corresponding to different hidden layers, X and $\hat{X}$ respectively represent original input data and autoencoder predicted data, D(•) computes and reflects a difference between X and $\overline{X}$, $\Omega$ represents a regularization term serving to prevent a prediction from overfitting, and L represents a cost function.

Figure 5:
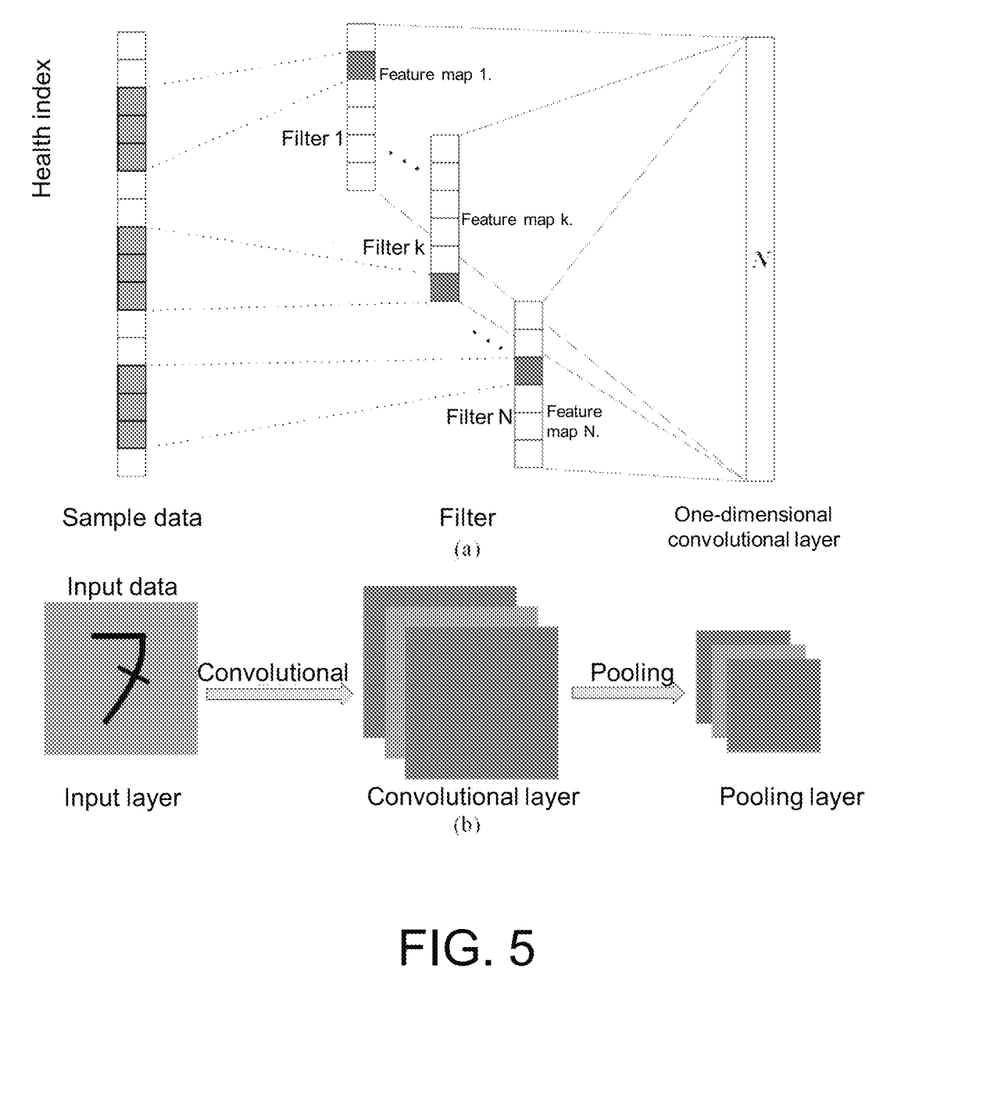
FIG. 5 is a schematic diagram illustrating a one-dimensional convolutional neural network, wherein (a) represents a one-dimensional convolutional layer, and (b) represents computing steps of the convolutional neural network.

Normally, a convolutional neural network processes two-dimensional image data. However, through some modification, such network can also process other data. In the embodiment of the invention, a one-dimensional convolutional neural network is used to reconstruct degeneration sample data into a format of two-dimensional data. Specifically, one dimensionality of the input sample of the network is the time cycle of the sample vector, and the other dimensionality is the actual value of the sample vector. As shown in FIG. 5, (a) represents a one-dimensional convolutional layer, and (b) represents the computing steps of the convolutional neural network. The convolutional neural network generally includes a convolutional layer and a pooling layer, and a convolutional computing operation c is described as follows:

$$c_{(a,b)} = \sum_m \sum_n P_{(a+m,b+n)} K_{(m,n)} = (P*K)_{(a,b)} \quad (3)$$

Here, P represents a two-dimensional image input amount, K represents a two-dimensional convolutional kernel, (a, b) represents the coordinates of an individual point of the two-dimensional image P, and m, n respectively represent step values in the directions a, b during the convolutional process.

The convolutional autoencoder mainly includes three different types of hidden layers, i.e., a convolutional layer, a pooling layer, an unpooling layer, and a deconvolutional layer. The convolutional layer mainly serves to simplify signal features and project a vector of low dimensionality to a space of high dimensionality while obtaining a compressed feature vector. The operation in the pooling layer further simplifies the input sample to remove redundant parameters. The unpooling layer and the deconvolutional layer serve to carry out operations reverse to the pooling layer and the convolutional layer, i.e., expanding the compressed sample vector again to obtain the complete output. In the embodiment, the training set and the test set are divided according to a 7:3 ratio. That is, 109 samples are randomly chosen as network training samples, while the remaining 47 samples serve as a validation set. The length of the input sample data is 15, and the parameter setting of the convolutional autoencoder is as shown in Table 2 below.

Table 2 shows parameter setting of the convolutional autoencoder.

| Type of hidden layer | Name of hidden layer | Filter Quantity | Filter Size |
|---|---|---|---|
| Convolutional layer | Convolutional layer 1 | 30 | 1 × 24 |
| | Convolutional layer 2 | 15 | 1 × 6 |
| Deconvolutional layer | Deconvolutional layer 1 | 30 | 24 × 1 |
| | Deconvolutional layer 2 | 15 | 6 × 1 |
| Pooling layer | Maximum pooling layer 1 | – | 1 × 12 |
| | Maximum pooling layer 2 | – | 1 × 15 |
| Unpooling layer | Unpooling layer 1 | – | 12 × 1 |
| | Unpooling layer 2 | – | 15 × 1 |

After the input features are re-arranged by the convolutional autoencoder, the feature information of the internal hidden layers thereof is extracted and transmitted to a subsequent LSTM-RNN to carry out a regression computational operation. Such a network avoids the issues of gradient vanishing and exploding in the conventional recursive neural network and mainly includes three types of gates, i.e., input gate, output gate, and forget gate.

An input gate $i_i$ determines whether to update the internal state of an LSTM unit and the information to be transmitted to the next step. An output gate $o_i$ filters and adjusts a portion of the output LSTM state, and the forget gate $f_i$ merges and infers the filtered information.

The mathematical computational process is as follows:

$$i_i = \sigma \cdot (w_{ix}x_i + w_{ih}h_{i-1} + b_i) \quad (4)$$

$$o_i = \sigma \cdot (w_{ox}x_i w_{oh}h_{i-1} + b_o) \quad (5)$$

$$f_i = \sigma \cdot (w_{fx}x_i + w_{fh}h_{i-1} + b_f) \quad (6)$$

Here, $w_{ix}$, $w_{ox}$, and $w_{fx}$ represent weight coefficients of an input amount $x_i$ corresponding to different gates, $w_{ih}$, $w_{oh}$, and $w_{fh}$ represent weight coefficients of a previous input amount $h_{i-1}$ corresponding to different gates, $b_i$, $b_o$, and $b_f$ represent bias coefficients of the input gate, the output gate, and the forget gate, and σ represents a sigmoid function:

$$\sigma(z) = \frac{1}{1 + e^{-z}} \quad (7)$$

Figure 6:
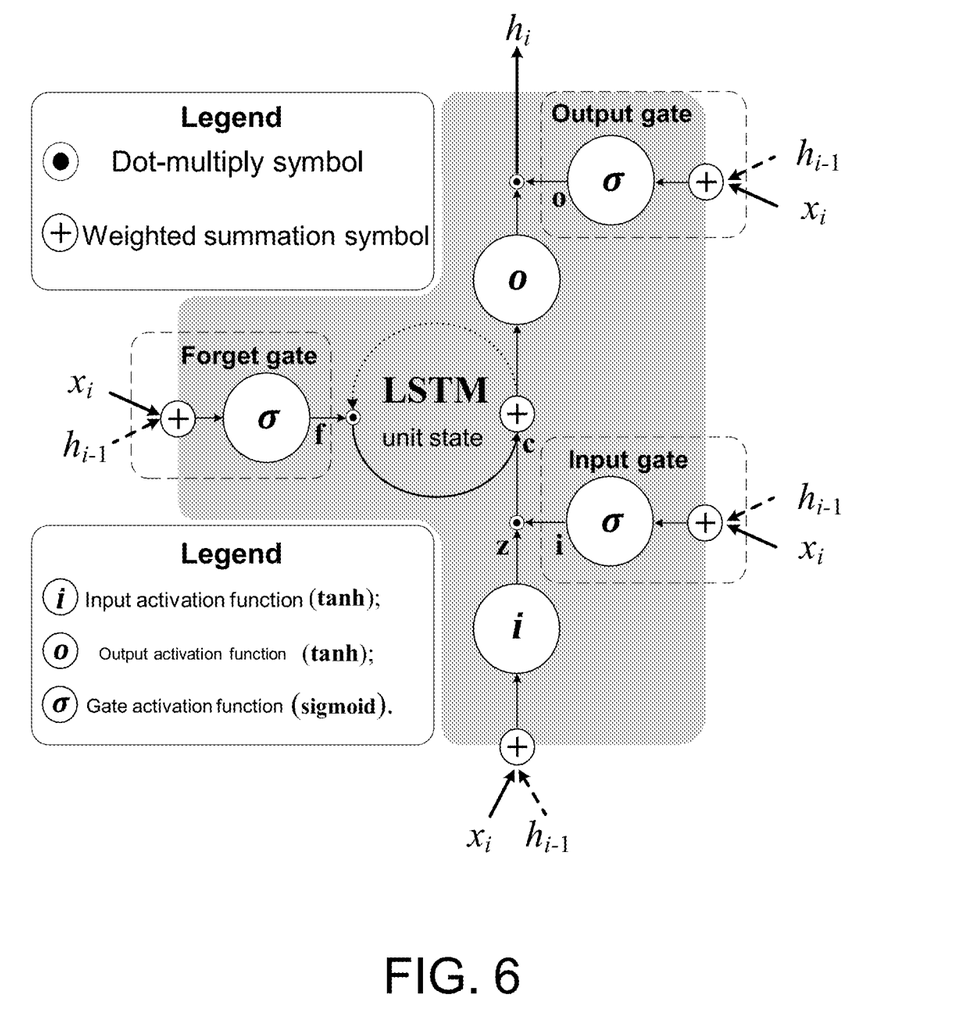
FIG. 6 is a schematic diagram illustrating computation of an individual LSTM unit according to an embodiment of the invention.

An individual LSTM unit is as shown in FIG. 6. The computational method of relevant parameters in FIG. 6 is as follows:

$$z_i = \varphi(w_{zx}x_i + w_{zh}h_{i-1} + b_z) \quad (8)$$

$$c_i = z_i \odot i_i + c_{i-1} \lfloor f_i \quad (9)$$

$$h_i = \varphi(c_i) \odot o_i \quad (10)$$

Here, $w_{zx}$, $w_{zh}$, and $b_z$ are respectively the weight coefficients and the bias amounts of the input amount $x_i$ and the previous input amount $h_{i-1}$ at the input node. Regarding the weight coefficients corresponding to different gates, $w_{ih}$, $w_{oh}$, $w_{fh}$ represent the weight coefficients of the previous input amount $h_{i-1}$ corresponding to different gates, $c_i$ and $c_{i-1}$ represent the internal state of the LSTM at the time and the previous state, ⊙ represents a dot-multiplication symbol, and σ represents a tanh function:

$$\varphi(z) = \frac{e^z - e^{-z}}{e^z + e^{-z}} \quad (11)$$

Figure 7:
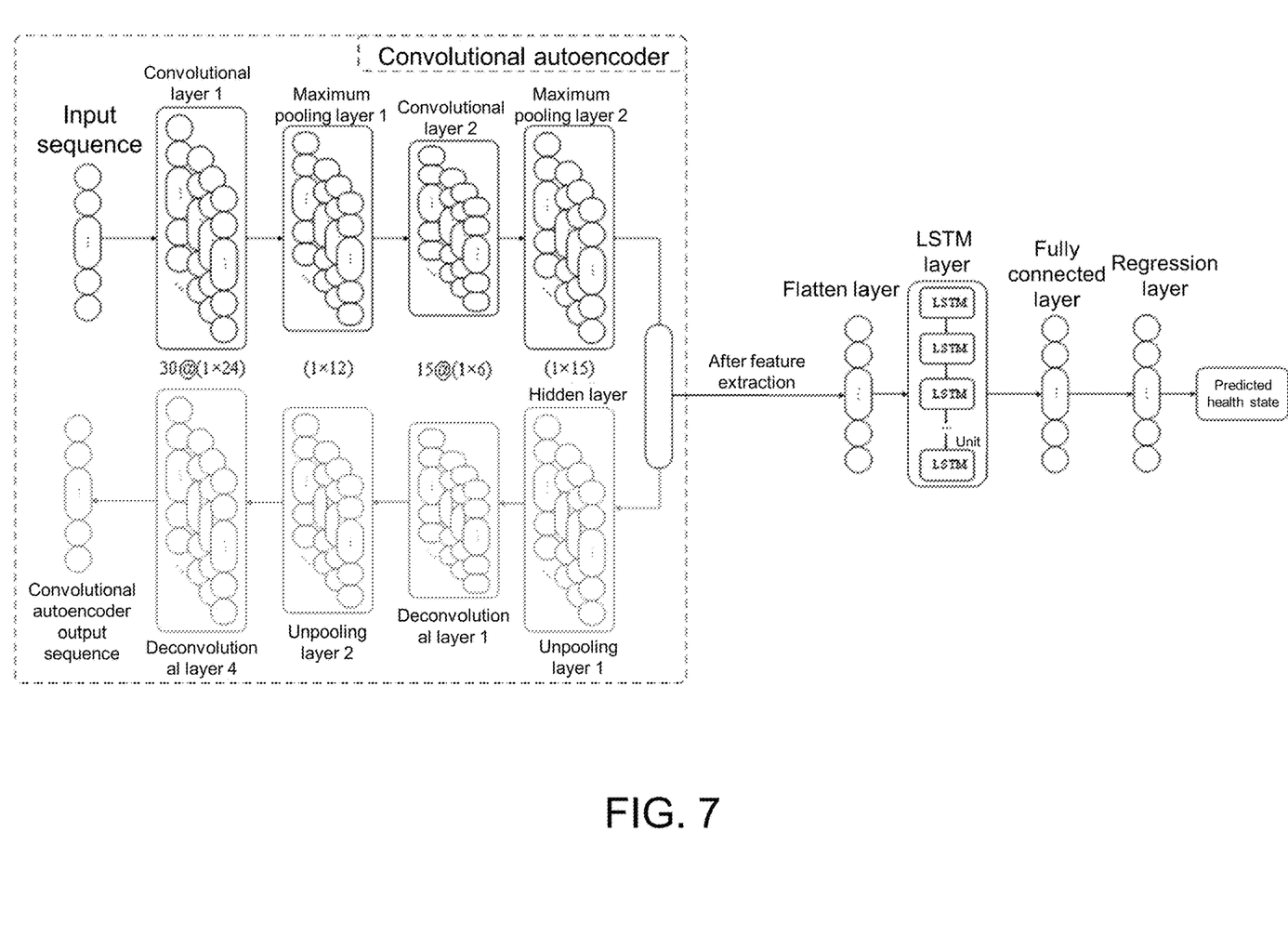
FIG. 7 is a diagram illustrating a structure of an integrated neural network structure according to an embodiment of the invention.

The structure of the integrated deep neural network provided in the embodiment of the invention is as shown in FIG. 7.

Specifically, the activation function of the hidden layer in the integrated network is the ReLu function, the optimization algorithm thereof is the Adam optimization algorithm. By minimizing the target function value through adjusting the weights, bias terms, and reference thresholds, the optimization is achieved.

In order to optimize the internal parameters of the network, the Adam optimization algorithm is adopted in the embodiment of the invention to optimize the global parameters.

The error function is expressed as follows:

$$L(\theta) = \frac{1}{N} \sum_{i=1}^{N} \|P(X_i; \theta) - Y_i\|^2 \quad (12)$$

Here, N represents the sample size, $Y_i$ represents the actually measured value, and $P(X_i;\theta)$ represents the network predicted value.

The process by which the Adam algorithm updates the network parameters is as follows:

$g_i$ represents the gradient of the error function $L(\theta)$ with respect to a hyperparameter set $\theta$:

$$g_i = \frac{1}{N} \nabla \theta \sum_{i=1}^{N} L(i, \theta) \qquad (13)$$

$m_i$ represents the first moment estimation with respect to $g_i$:

$$m_i = u \times m_{i-1} + (1-u)g_i \qquad (14)$$

u represents the speed.

$n_i$ represents the second moment estimation with respect to $g_i$:

$$n_i = v \times n_{i-1} + (1-v)g_i^2 \qquad (15)$$

V represents the speed.

$\widehat{m_i}$ represents the error correction to $m_i$, wherein a speed value u is set as 0.9:

$$\widehat{m_i} = \frac{m_i}{1 - u^i} \qquad (16)$$

$\widehat{n_i}$ represents the error correction to $n_i$, wherein a speed value v is set as 0.99:

$$\widehat{n_i} = \frac{n_i}{1 - v^i} \qquad (17)$$

$\Delta \theta_i$ represents the increment of the hyperparameter set $\theta$, wherein a value of $\eta$ is set as 0.001, and a value of $\varepsilon$ is set as $10^{-8}$:

$$\Delta \theta_i = -\eta \frac{\widehat{m_i}}{\sqrt{\widehat{n_i}} + \varepsilon} \qquad (18)$$

$$\theta_{i+1} = \theta_i + \Delta \theta_i \qquad (19)$$

Compared with the random gradient descent algorithm, the Adam optimization algorithm provides independent self-adaptive learning rates for different hyperparameters by computing the moment estimates of the gradient $g_i$. In addition, the Adam optimization algorithm exhibits a high computational efficiency while requiring a limited portion of the internal memory.

(4) The validity of the circuit health state prediction method is evaluated by referring to relevant evaluation indices.

In the embodiment of the invention, two evaluation mechanisms, i.e., the score function and the root-mean-square error, are used to evaluate the prediction performance.

Score function:

$$g = \sum_{i=1}^{N} g_i \qquad (20)$$

$$g_i = \begin{cases} \exp\left(-\frac{e_i}{13}\right) - 1, & e_i < 0, \\ \exp\left(\frac{e_i}{10}\right) - 1, & e_i \geq 0. \end{cases} \qquad (21)$$

$$e_i = \overline{HI_i} - HI_i \qquad (22)$$

Here, $\overline{HI_i}$ represents a health index obtained in the $i^{th}$ prediction, and $HI_i$ represents a health index obtained in the $i^{th}$ computation.

Root-mean-square error:

$$RMSE = \sqrt{\frac{1}{N} \sum_{i=1}^{N} e_i^2} \qquad (23)$$

In the following, the prediction performance of the integrated deep neural network (i.e., CAE-LSTM) proposed in the embodiment of the invention is evaluated by using the two evaluation criteria above, and is compared with the prediction performances of three commonly used data-driven algorithms, i.e., the deep convolutional neural network (DCNN), the general long short term memory network (LSTM), and the support vector machine (SVM). The results are as shown in Table 3, and a portion of the health state prediction results is as shown in FIG. 8, in which (a) represents a test sample #31, (b) represents a test sample #62, (c) represents a test sample #81, and (d) represents a test sample #106.

Table 3 shows results of comparison on the prediction performance.

| Prediction method | Root-mean-square error | Score function |
|---|---|---|
| CAE-LSTM | 0.057 | 17.10 |
| DCNN | 0.103 | 26.43 |
| LSTM | 0.083 | 18.65 |
| SVM | 0.193 | 98.63 |

Figure 8:
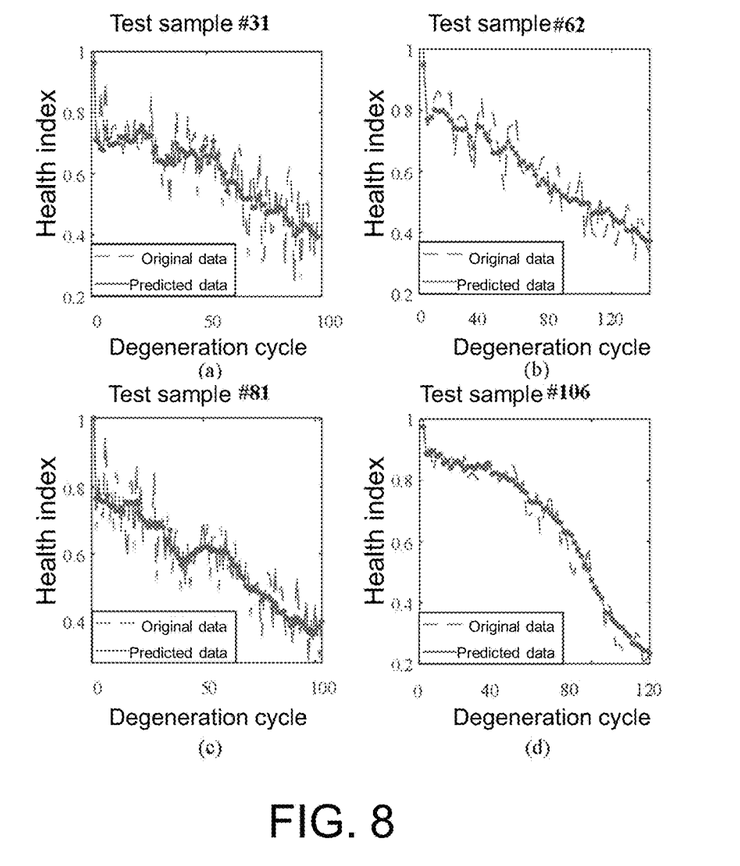
FIG. 8 is a diagram with a portion of health index prediction results according to an embodiment of the invention, wherein (a) represents a test sample #31, (b) represents a test sample #62, (c) represents a test sample ##81, and (d) represents a test sample #106.

According to Table 3 and FIG. 8, the integrated deep neural network according to the invention exhibits the smallest root-mean-square error and score function error, and the prediction curve thereof effectively fits the actual health state of the power circuit. In other words, the integrated deep neural network according to the invention is highly accurate and easy to implement.

Figure 9:
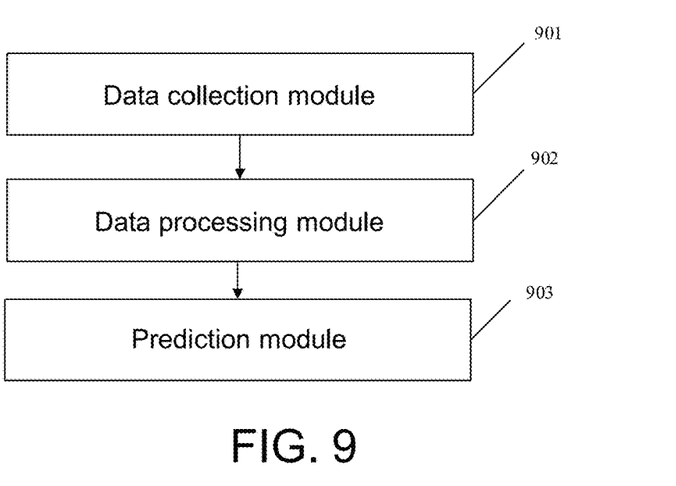
FIG. 9 is a schematic diagram illustrating a structure of a system according to an embodiment of the invention.

FIG. 9 shows a schematic view illustrating a structure of a circuit health state prediction system based on an integrated deep neural network according to an embodiment of the invention. The circuit health state prediction system includes: a data collection module 901, configured to establish a regeneration simulation model of a circuit to be predicted, carry out parameter aging simulation experiments for different devices, and collect output signals of the respective devices; a data processing module 902, configured to extract time domain features of the output signals of the respective devices through a temporal transformation method, and establish a health index of each of the devices based on each of the time domain features; and a prediction module 903, configured to predict a health state of the circuit to be predicted which is in degeneration by using a convolutional autoencoder (CAE) and a long short term memory-recurrent neural network (LSTM-RNN) together based on the health index of each of the devices.

In an embodiment of the invention, the system may further include an evaluation module. The evaluation module is configured to evaluate a prediction performance by adopting relevant evaluation criteria, including the score function and the root-mean-square error.

Details about the specific embodiments of the respective modules have been described above for the embodiment of the failure diagnosis method. Thus, the same details will not be repeated in the following.

The invention further provides a non-transitory computer-readable storage medium, such as a flash drive, a hard drive, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic drive, an optical drive, a server, an APP market, in which a computer program is stored. When being executed by a processor, the program realizes the circuit health state prediction method based on the integrated deep neural network according to an embodiment of the invention.

It should be noted that, based on the needs for implementation, each step/member described in the embodiments of the invention may be divided into further steps/members, or two or more steps/members or portions of steps/members may be combined to form a new step/member to realize the objective of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A circuit health state prediction method based on an integrated deep neural network, the circuit health state prediction method comprising:
   (1) establishing a regeneration simulation model of a circuit to be predicted, carrying out parameter aging simulation experiments for different devices, and collecting output signals of the respective devices;
   (2) extracting time domain features of the output signals of the respective devices through a temporal transformation method, and establishing a health index of each of the devices based on each of the time domain features; and
   (3) predicting a health state of the circuit to be predicted which is in degeneration by using a convolutional autoencoder (CAE) and a long short term memory-recurrent neural network (LSTM-RNN) together based on the health index of each of the devices.

2. The circuit health state prediction method as claimed in claim 1, wherein the health index of each of the devices is established through $$dis(x_1, x_2) = 1 - \frac{1}{\pi} \cdot \arccos \frac{x_1 \cdot x_2}{\sqrt{\sum_{k=1}^{n} [x_1^{(k)}]^2 \times \sum_{k=1}^{n} [x_2^{(k)}]^2}},$$

wherein
$x_1 = (x_1^{(1)}, x_1^{(2)}, \ldots, x_1^{(n)})$ represents a time domain feature of the output signal of the device under a healthy state, $x_2 = (x_2^{(1)}, x_2^{(2)}, \ldots, x_2^{(n)})$ represents a time domain feature of the output signal of the device during an aging process, and n represents a time domain feature vector length.

3. The circuit health state prediction method as claimed in claim 1, wherein in (2), 10 time domain feature indices that are extracted comprise:

$$tf_1 = \max(s_t),$$

$$tf_2 = \frac{1}{N} \sum_{t=1}^{N} s_t,$$

$$tf_3 = \frac{1}{N} \sum_{t=1}^{N} s_t^2,$$

$$tf_4 = \sqrt{\frac{1}{N} \sum_{t=1}^{N} (s_t - \bar{s})^2},$$

$$tf_5 = \sqrt{\frac{1}{N} \sum_{t=1}^{N} (s_t - \bar{s})^3},$$

$$tf_6 = \frac{tf_5^2}{tf_4^3},$$

$$tf_7 = \frac{tf_1}{|\bar{s}|},$$

$$tf_8 = \frac{tf_1}{tf_3},$$

$$tf_9 = \frac{tf_1}{tf_2},$$

and $$tf_{10} = \frac{\frac{1}{N} \sum_{t=1}^{N} (s_t - \bar{s})^4}{tf_4^4},$$

wherein $s_t$ represents an output signal value at a point t in a degeneration process at a current time, N represents a total number of output signal points of a degeneration sample at the time, and the output signals are divided into two groups, wherein $tf_1$ to $tf_3$ describe original output signals according to an influence of energy accumulation of the output signals, $tf_4$ to $tf_{10}$ describe the original output signals from a perspective of statistic distribution, and $\bar{s}$ represents an arithmetic mean of the output signals of the degeneration sample at the time.

4. The circuit health state prediction method as claimed in claim 3, the CAE comprises three types of hidden layers, which are a convolutional layer, a pooling layer, and a deconvolutional layer, represented as $$\begin{cases} l = P(AF(conv(X) + b_1)) \\ \hat{X} = AG(de\_conv(l) + b_2), \\ \min L = D(X, \hat{X}) + \Omega \end{cases}$$

wherein P(•), conv(•), and de_conv(•) are respectively symbols representing pooling, convolutional and deconvolutional operations, AF(•) and AG(•) represent activation functions corresponding to different hidden layers, $b_1$ and $b_2$ represent bias terms corresponding to different hidden layers, X and $\hat{X}$ respectively represent original input data and autoencoder predicted data, D(•) computes and reflects a difference between X and $\hat{X}$, $\Omega$ represents a regularization term serving to prevent a prediction from overfitting, and L represents a cost function.

5. The circuit health state prediction method as claimed in claim 4, wherein (3) comprises:

processing the health index of each of the devices by using the CAE, extracting and transmitting feature information of the hidden layers in the CAE to the LSTM-RNN to carry out a regression computational operation, and updating a network parameter by using an Adam algorithm.

6. The circuit health state prediction method as claimed in claim 1, further comprising:

evaluating a prediction performance by adopting relevant evaluation criteria, wherein the evaluation criteria comprise a score function and a root-mean-square error.

7. A circuit health state prediction system based on an integrated deep neural network, the circuit health state prediction system comprising:

a data collection module, configured to establish a regeneration simulation model of a circuit to be predicted, carry out parameter aging simulation experiments for different devices, and collect output signals of the respective devices;

a data processing module, configured to extract time domain features of the output signals of the respective devices through a temporal transformation method, and establish a health index of each of the devices based on each of the time domain features; and a prediction module, configured to predict a health state of the circuit to be predicted which is in degeneration by using a convolutional autoencoder (CAE) and a long short term memory-recurrent neural network (LSTM-RNN) together based on the health index of each of the devices.

8. The circuit health state prediction system as claimed in claim 7, further comprising:

an evaluation module, configured to evaluate a prediction performance by adopting relevant evaluation criteria, wherein the evaluation criteria comprise a score function and a root-mean-square error.

9. A non-transitory computer-readable storage medium, storing a computer program, wherein the computer program realizes the circuit health state prediction method according to claim 1 when being executed by a processor.

* * * * *